Nov. 29, 1938.   W. N. SCHNELL   2,138,124
LICENSE PLATE FRAME
Filed March 12, 1938
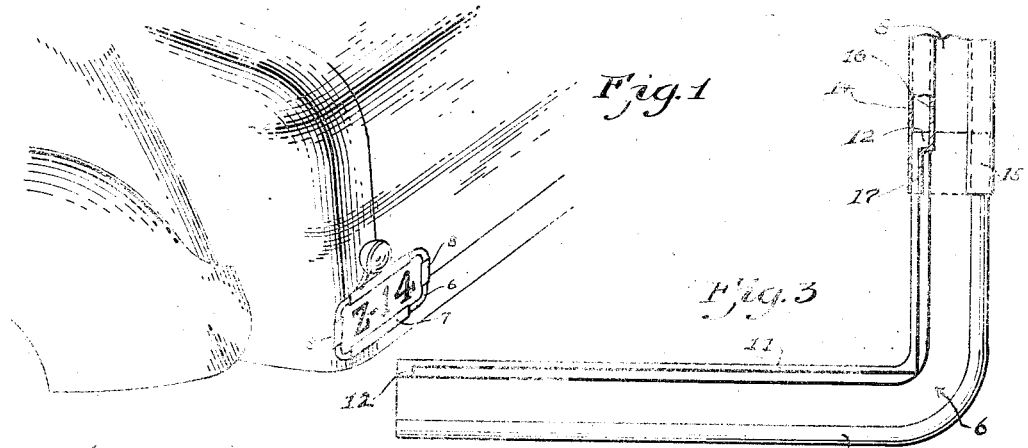
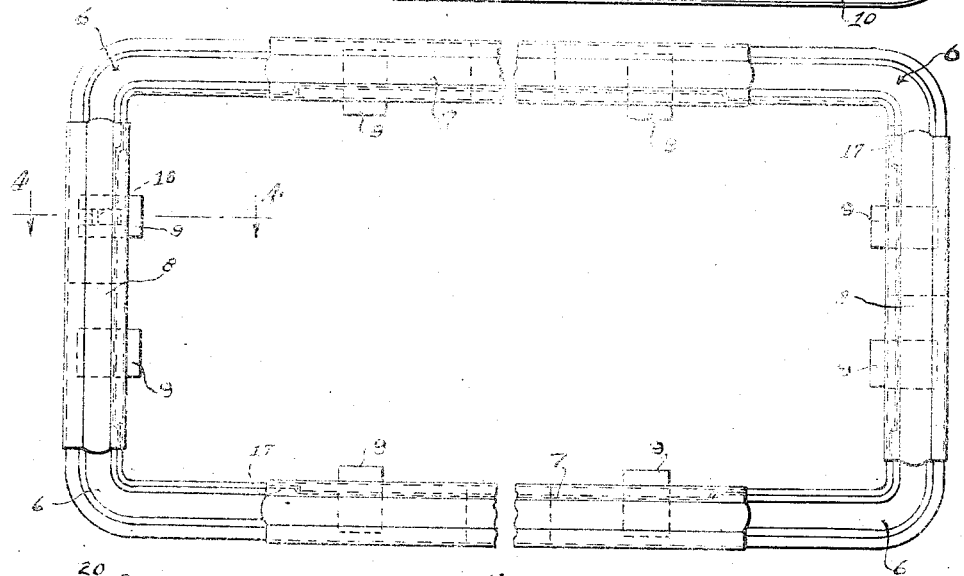
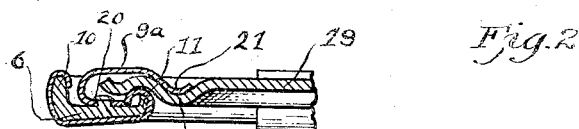
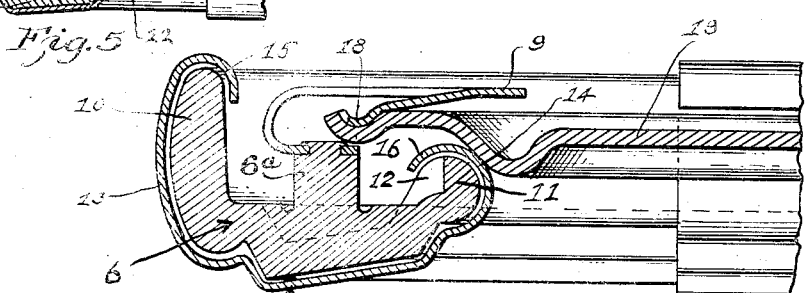
INVENTOR.
William N. Schnell
BY Barnes, Kisselle, Laughlin & Raisch
ATTORNEY.

Patented Nov. 29, 1938

2,138,124

UNITED STATES PATENT OFFICE 2,138,124

LICENSE PLATE FRAME

William N. Schnell, Detroit, Mich.

Application March 18, 1938, Serial No. 196,732

4 Claims. (Cl. 40—125)

This invention relates to an extensible decorative frame for license plates.

An object of the present invention is to provide a decorative frame which will fit license plates of various sizes and which may be conveniently mounted thereon. With previous devices in this art it has been necessary to use a screw driver or pliers or other tool for fastening the frames to the license plates. An object of the present invention is to avoid the inconvenience and necessity for tightening screws or bending fasteners. This object has been accomplished by a novel design of a decorative frame and the use of fastening clips which secure the frame on all four sides of the license plate.

Another object of the invention has to do with details in the design of stopping lugs to prevent detachment of the parts of the frame.

Other objects and features of the invention have to do with details of construction of the slides of the frame and the fastening clips as will be brought out in the following description and claims.

In the drawing:

Fig. 1 illustrates the decorative frame as it is used around a license plate on a vehicle.

Fig. 2 is a front assembly view of the frame.

Fig. 3 is a partial rear view of the frame with a portion in cross section to illustrate the details.

Figs. 4 and 5 illustrate two modifications of the fastening clips to be used with the frame.

Referring to Fig. 2, the decorative frame consists of L-shaped or angular corner members 6 and straight connecting sections 7 and 8. The longer sections 7 are for the horizontal sides of the frame and the shorter sections 8 are for the vertical sides of the frame. Clips 9 are mounted on the legs of the corner members 6.

Referring to the corner members in detail, they have a channelled cross section, as shown in Figs. 4 and 5, with sides 10 and 11 forming the channel. The outer side 10 is preferably higher than the inner side 11. An inwardly extending stop lug 12 is formed on the sides 11 of each corner at both outer extremities (Fig. 3). The corners 6 are designed so that they may be made as diecasting. Consequently, they furnish a rigidity to the frame.

The straight connection sections 7 and 8 also have a channel cross section with sides 13 and 14, as shown in Figs. 4 and 5. These straight sections are formed to telescope the respective legs of the corner members 6. The outer edges of the sides 13 and 14 are rolled over the sides 10 and 11 of the corner sections, as shown at 15 and 16 in Fig. 4. A sliding fit is thus provided between the corner sections and the straight sections. As best illustrated in Fig. 3, the rolled edge 16 is formed to enclose the lug 12 which may slide therein. After the corners and the straight sections are assembled, the ends of the rolled edge 16 on the sides 13 of the straight sections are crimped as shown at 17 to form a narrowed section which will slide on the sides 11 of the corners. These crimped portions 17 will cooperate with the lugs 12 to guide the sliding parts and to lock the various members from separating when fully extended.

The straight sections 7 and 8 are stampings of sheet metal. Since the corners 6 are diecastings and the straight sections stampings the frame is considerably less expensive to manufacture than license frames previously designed.

Mounted on each leg of the corners 6 are the clips 9 which are formed of spring steel. In the modification of the spring clips shown in Fig. 4, a struck out portion 18 is formed with a curved portion which is adapted to lock with the embossed rib or groove usually formed at the edge of a standard license plate 19. The corners 6 of Fig. 4 are provided with raised portions 6a, to the top of which the clips 9 are riveted. In Fig. 5 a slightly different modification of spring clip 9a is illustrated. An anchoring portion 20 of the U-shaped clip is riveted to the corner member 6 and a curved portion 21 engages a groove 22 surrounding the edge of the license plate 19.

It will be seen that to mount the decorative frame it is necessary only to open the frame to dimensions larger than the license plate, place it around the plate and collapse it so that the spring clips 9 engage the respective sides of the plate and snap-over into engagement with the grooves at the edge of the plate. The clips are formed in such a manner that they will be under tension when the plate is in position so that there is no chance that the frame will become loose or rattle on the plate.

What I claim is:

1. An adjustable frame for a license number plate having edge grooves, comprising angle members, connecting sections slidably telescoping the respective legs of said angle members to form an expansible frame, and spring clip means on said angle members comprising a piece of spring material bent upon itself to form an anchoring portion and a plate engaging portion extending parallel to and spaced from the anchoring portion and provided with a convex portion for engaging the groove of the plate.

2. An adjustable frame for a license number plate having edge grooves, comprising angle members, connecting sections slidably telescoping the respective legs of said angle members to form an expansible frame, means on said members and means on said sections for guiding the relative movement therebetween, and spring clip means on said angle members comprising a U-shaped spring piece having one leg adapted to serve as an anchoring portion to be riveted to the angle members and another leg extending parallel to and beyond the anchoring leg and having a convex portion for engaging the groove of a license plate.

3. An adjustable frame for a license number plate having edge grooves, comprising angle members, connecting sections slidably telescoping the respective legs of said angle members to form an expansible frame, means on said members and means on said sections for guiding the relative movement therebetween, and spring clip means on said angle members comprising a substantially U-shaped spring piece having one leg of the U adapted to be riveted to a raised portion on said angle members and the other leg of the U extending parallel to and spaced from the first leg and having struck out portions pointing toward the bight of the U and provided with a convex portion for engaging the edge groove of a license plate.

4. An adjustable frame for a license number plate having edge grooves, comprising angle members, connecting sections slidably telescoping the respective legs of said angle members to form an expansible frame adapted to receive the edges of said plate, and spring clip means on said angle members comprising a piece of spring material bent upon itself to form a U-shaped spring adapted to receive the edges of said plate and having portions for engaging the groove of the plate.

WILLIAM N. SCHNELL.